Oct. 31, 1944.  R. B. McKINNIS  2,361,640
PROCESS AND APPARATUS FOR STORING LIQUIDS
Filed Oct. 11, 1939  2 Sheets-Sheet 2
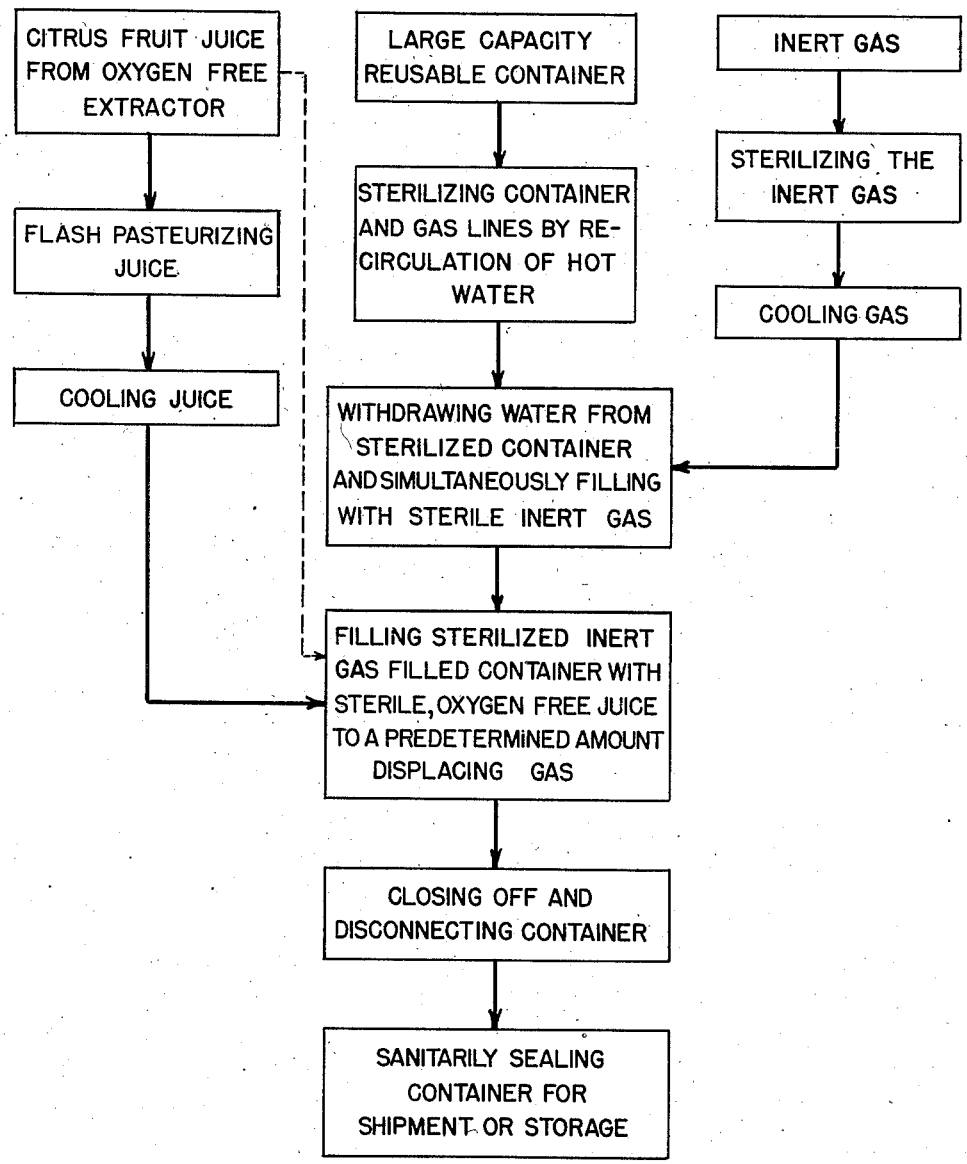

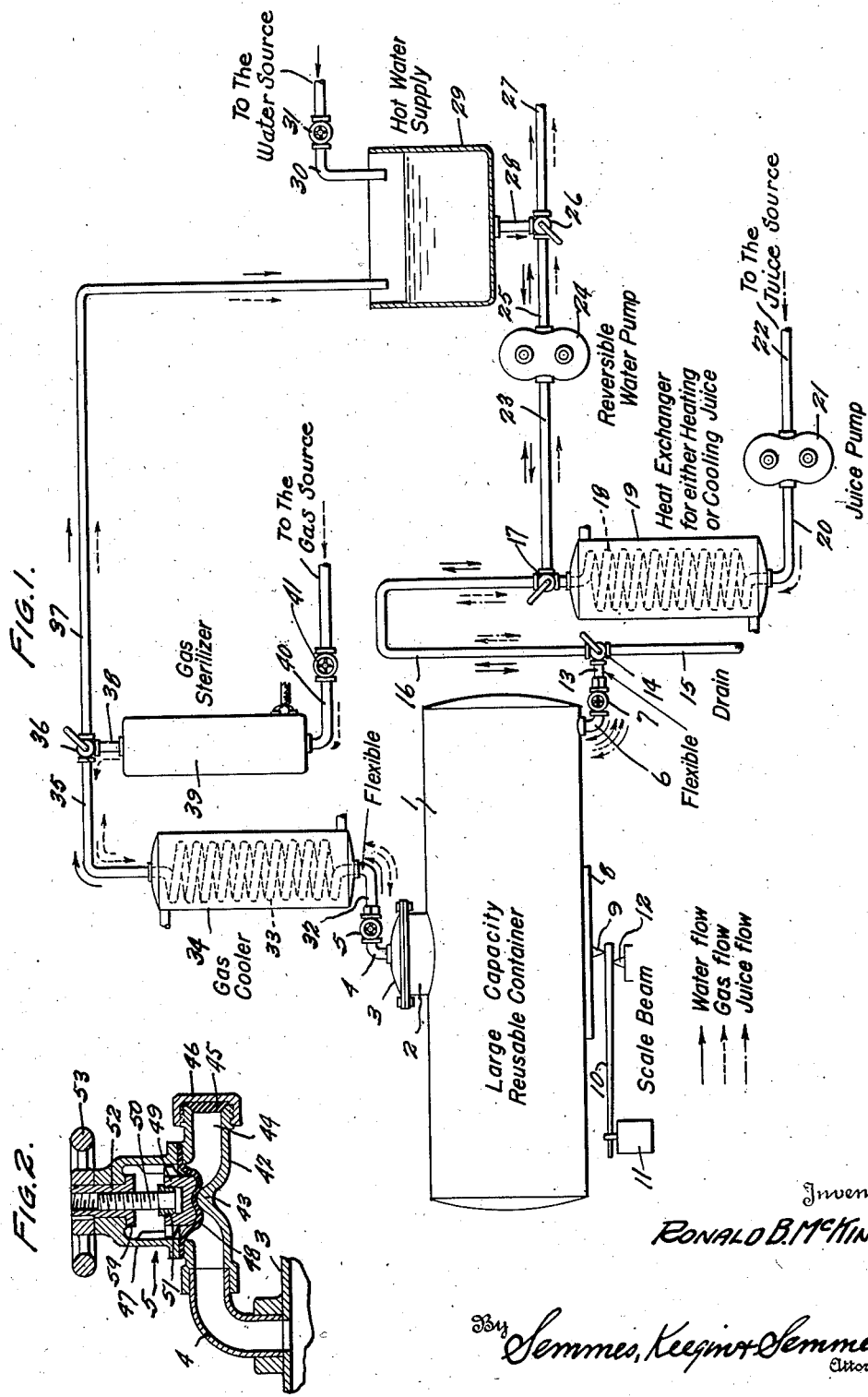

Patented Oct. 31, 1944

2,361,640

UNITED STATES PATENT OFFICE 2,361,640

PROCESS AND APPARATUS FOR STORING LIQUIDS

Ronald B. McKinnis, Winter Haven, Fla.

Application October 11, 1939, Serial No. 299,022

2 Claims. (Cl. 226—68)

My invention relates to filling containers, and particularly to filling containers with sterile, unoxidized liquids.

My invention relates more particularly to the storing of fruit and vegetable juices, such as orange and grapefruit juice. At present, the four general ways of distributing fruit juices are (1) by canning or bottling, (2) by concentrating and canning, or bottling, or freezing, (3) by freezing and maintaining low temperatures, and (4) by shipping the fresh fruit and extracting the juice near the place of use. These methods apply not only to the juice in natural unsweetened form, but it is obvious that diluted preparations, or mixtures, can be distributed by all methods except the fourth method above outlined.

One of the objects of the invention is to provide a means for storing in bulk, unoxidized, sterile liquids, such as juices of vegetables and fruits, for instance orange and grapefruit juice. The juices may be in natural concentration, or they may be concentrated or diluted.

A further object of the invention is to provide means for storing a predetermined amount of juice, thus providing means for readily shipping a predetermined amount in a container.

Another object of the invention is to store fruit or vegetable juice in large size bulk containers in such a manner that refrigeration is not necessary.

As above set forth, not only is it a purpose to supply means for storing in sterile condition oxygen-free juice, but also means are provided for withdrawal of the juice in a sterile oxygen-free condition.

My process and apparatus permit the stored liquids to retain their sterility, their natural flavor, and food value over several months' time without use of refrigeration. Moreover, apparatus is used which is easily repaired and replaced. The process employed is simple to carry out, and efficient in operation.

By means of this invention, new methods for distributing fruit juices are for the first time made available and practical. By using this invention, orange juice may be stored in tanks with or without refrigeration until needed for canning or bottling. Means for sterile canning are not now commercially available, but bottling means have been in use for several years and may be practical for this particular purpose. Instead of packaging the juice direct from the tank, it may be combined with sterile water, sterile sugar solution and any other ingredients properly sterilized to produce a sterile ade to be bottled in a sterile condition, or to be bottled with allowable preservatives, or filled into milk-type bottles to be delivered in the distribution channels now used for orangeade in such bottles.

At the present time, much orange juice is being concentrated and sold to dairies or other establishments for the making of orangeade to be sold in milk-type bottles. It is well known that the evaporation process removes all of the natural aroma and leaves a flat-tasting product, and that, so far, it has been impossible to concentrate and at the same time avoid this serious objection. Many manufacturers of orangeade have preferred to extract the juice from the fruit themselves at the time the juice is needed so as to obtain a better product. However, good fresh fruit is available during only a portion of the year, and during a part of that time the prices are for a scarcity item.

By my system, juice may be extracted from the fruit where the fruit is grown and then stored or shipped in suitable tanks. These filled tanks can be stored until needed, and can be used any number of times. They can be constructed so that they can be loaded and unloaded from trucks on which they are transported.

My preferable procedure is to pasteurize the juice before it goes into the tanks, but if means were available for the producing of sterile juice from sterile fruit without heating the juice, such a system could be used.

In the drawings:

Figure 1 is a diagrammatic illustration of an apparatus assembly carrying out the process of my invention.

Fig. 2 is a cross-sectional view taken through the valve for maintaining juice in sterile condition in the container.

Fig. 3 is a flow sheet illustrating one form of my process.

The juice, such as citrous fruit juice, is obtained oxygen-free from the extractor and may be then flash pasteurized and cooled, or the juice may be used without flash pasteurization and cooling, provided it can be obtained in sterile form from the extractor.

A large-capacity reusable container is sterilized, and the gas lines leading to and from it are sterilized by recirculating hot water. The water is withdrawn from the sterilized container, and the container is filled with a sterile inert gas, which has been previously sterilized and cooled.

The container now is full with sterile, inert gas and the oxygen-free sterile juice is introduced into the container to a predetermined amount displacing the gas. The container is then closed and disconnected and, thus sealed, may be shipped or stored.

The above described process is obvious from an inspection of the flow sheet.

Referring now to the drawings, Figs. 1 and 2, I have shown a large-capacity reusable container 1, which is provided with a cleaning opening 2 having a closure plate 3 thereon. Mounted on the closure plate 3 is a short length of conduit 4, which carries a valve 5 to be later described in more detail. At the bottom of the container is a short section of conduit 6, which carries a valve 7 similar to the valve 5.

The container 1 rests on a support 8, having a fulcrum 9, which bears against one end of a scale beam 10, having an adjustable weight 11 adapted to be moved along the beam, so that a desired weight of liquid may be introduced into the container 1. The scale beam is pivoted on its lower side on a pivot 12.

The valve 7 is connected to a length of pipe 13, which joins with a two-way valve 14. The two-way valve 14 is connected to a section 15, which operates as a drain, and to a pipe section 16 which connects to a two-way valve 17. From the two-way valve 17 there is a coil 18, which leads through a heat exchanger 19 for either heating or cooling the liquid. The coil 18, through a length of pipe 20, is connected to a juice pump 21, which draws a supply of sterile, unoxidized juice through the line 22 from some suitable source of supply.

Connected to the two-way valve 17 is a section of pipe 23, which leads to a reversible water pump 24, connected through a line 25 to a two-way valve 26.

The two-way valve 26 is connected to a discharge pipe 27 and to a discharge line 28 leading from a hot water supply tank 29. The hot water supply tank 29 may be supplied with water through a line 30 controlled by a valve 31. Means are not shown for heating the water in the hot water supply tank 29, but any suitable means of heating may be employed. In fact, the water may be delivered from the line 30 at a sufficient temperature to cause the water to effectively sterilize the apparatus.

Connected to the sanitary valve 5, which is, as before stated, similar in construction to the sanitary valve 7, is a line 32 which is connected to a coil 33 in a gas cooler element 34. Connected to the coil 33 is a line 35, which terminates in a two-way valve 36. Leading into the two-way valve 36 is a line 37, which is adapted to discharge into the hot water supply tank 29.

Also leading into the two-way valve 36 is a section of pipe 38 connected to a gas sterilizer 39, which is supplied with gas through a gas line 40, in which is located a control valve 41.

The sanitary valves 5 and 7 are similar in construction. The valve 5 will be described, and it is to be understood that the valve 7 is substantially identical. Valve 5, as has been explained, is connected to a short length of pipe 4 which leads into the cover 3 of the cleaning man hole 2 of the reusable container 1. The valve has a body 42 having an interior raised portion 43. The valve body 42 terminates in an extension 44, which may be coupled to the line 32, which in Fig. 2 is shown closed by a sanitary plug 45, which fits into the beveled end of the extension 44. The sanitary plug 45 is covered with a holding cap 46, which is screw-threaded in place and is adapted to compress the sanitary plug 45 firmly into the beveled end of the extension 44 of the valve body 42.

Mounted above the valve body 42 is an upwardly extending support 47 which may be mounted on the valve body and held in place by means of bolts or other suitable attaching means, not shown. Between the extension 47 and the valve body 42 is positioned a flexible diaphragm 48, which may be of rubber or any other suitable material. There is a plunger member 49 mounted within the member 47 which is adapted to be reciprocated in that member by means of a screw-threaded shaft 50, which is held in place by means of a screw plug 51, which fits into an aperture in the plunger member 49.

The screw threaded shaft 50 fits within a screw threaded element 52, which is keyed to and adapted to revolve with the valve operating wheel 53. The member 52 is provided with a shoulder 54 which bears at its upper side against a seat formed in the member 47.

The sanitary valve 5 is so constructed that, by turning the valve operated wheel 53 so that the parts occupy the position shown in Fig. 2, the diaphragm 48 will be pressed tightly against the upwardly extending portion 43 of the valve body 42. This seals the line 4 which leads into the container 1, and prevents access of any oxidizing gas or any bacteria into the container 1. The valve 5 and the similar valve 7 thus form sterile closures for the tank 1. The tank 1, therefore, may be shipped to distant points, and the contents will remain sterile and unoxidized until the cap 46 is removed and the valve opened to permit the contents of the container to be withdrawn.

In operation, the first step is to thoroughly sterilize the apparatus, which is accomplished by filling the apparatus and the lines with hot water or other suitable fluid. Hot water from the hot water supply 29 is withdrawn through the line 28, the valve 26, the line 25, and is pumped by pump 24 into the line 23. The valve 17 is set so that the hot water passes through the line 16, the valve 14, the line 13, the valve 7 and through the short line 6 into the container 1.

The container 1 is filled with hot sterilizing water and the water rises, completely filling the container, and forcing the water out through the line 4, the sterile valve 5, the line 32, coil 33, and line 35. From the line 35, the hot water is forced by the pump 24 through the valve 36 and the line 37, back to the hot water supply 29.

When all of the lines have been thoroughly sterilized and heated to the required temperature, the next step is to replace the sterilizing liquid with a sterile, non-oxidizing or inert gas. The gas is introduced through the line 40, the valve 41 being set to permit passage of the gas into the gas sterilizer 39, through the pipe 38 to the valve 36, which is so adjusted as to permit the sterilized gas to pass from the line 38 into the line 35, through the coil 33 in the gas cooler 34, where it is reduced to the desired temperature, whence the gas passes down through line 32, valve 5, and line 4, into the container 1.

Water is being forced out ahead of the sterile gas through the line 6, the valve 7, the line 13, the valve 14, the line 16, the valve 17, the line 23, the pump 24, the valve 26, and the line 27 or 28. The valves are so set as to permit the liquid to flow in the direction indicated. The gas is allowed to flow until all of the lines are completely purged of the liquid. The pump 24 has been reversed in its operation to suck the water out of the apparatus ahead of the sterile, inert gas introduced into the apparatus.

When the apparatus no longer contains any water, it will be found to be full of inert, unoxidizing, sterile gas. The reversible pump 24 is shut off. Valve 36 is adjusted to permit free flow of gas between pipes 35 and 37. The juice pump 21 is started, and sterile non-oxidized juice is drawn through the line 22 from some suitable source, forced into the line 20 up through heat exchanger 19, wherein the juice in the coil 18 is either heated or cooled, depending upon how the process is to be run. Let us assume that the juice is reduced in temperature, since it is more practical to reduce the temperature of hot juice in a heat exchanger than in such a tank as shown. The valve 17 is adjusted to permit flow of the sterile juice from the coil 18 to the line 16, through valve 14 to line 13, valve 7, and line 6, into the container 1. The inert gas in the container 1, and in the lines just described, is forced out ahead of the juice. As indicated by the arrows, this gas passes out through valve 5, the coil 33 in the gas cooler, and out through line 37 (see dotted arrow).

When the container 1 has been filled sufficiently with liquid, a scale beam will indicate this condition. The sanitary valve 7 is shut and the two-way valve 36 is turned so as to charge the container with gas and provide a positive pressure of a few pounds, sufficient to prevent subsequent creation of a vacuum by solution of the gas, condensation of vapors or decrease of temperature. After the container has been charged with gas, valve 36 is closed completely, after which sanitary valve 5 is closed. The container may be removed, and the valves 5 and 7 capped for shipment or storage.

The non-oxidized, sterile juice in the container 1 can be kept without refrigeration for a long period of time and will not suffer deterioration. Another container 1 can be mounted in place of the one just removed, and the process repeated.

It is to be understood that, in order to prevent a high vacuum in the container 1, I will provide for a method and apparatus to introduce gas under pressure into the container after it has been filled to the proper level.

Carbon dioxide is highly soluble in the juice; nitrogen is much less soluble. I may use nitrogen, or a mixture of nitrogen and carbon dioxide.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a method of packaging oxidizable juice such as fruit or vegetable juices, the steps of admitting a sterilizing liquid into a sealable container, introducing an inert gas to displace the liquid, displacing the inert gas by the admission of juice into the container, charging the container with additional gas to provide after sealing a substantially atmospheric pressure within the container after the container is sealed, and sealing the container.

2. A method of filling a container with a juice subject to oxidation such as fruit or vegetable juices, comprising the steps of introducing into a sealable container a hot sterilizing liquid, then removing the hot sterilizing liquid by replacing the said liquid with an inert gas, displacing the inert gas with heated sterilized juice, charging the container with additional gas to provide after sealing a substantially atmospheric pressure within the container after the juice has cooled, and sealing the container.

RONALD B. McKINNIS.